(12) United States Patent
Cioffi

(10) Patent No.: US 7,809,996 B2
(45) Date of Patent: *Oct. 5, 2010

(54) ADAPTIVE FEC CODEWORD MANAGEMENT

(75) Inventor: John M. Cioffi, Atherton, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/185,729

(22) Filed: Aug. 4, 2008

(65) Prior Publication Data
US 2009/0086800 A1    Apr. 2, 2009

Related U.S. Application Data

(62) Division of application No. 10/795,593, filed on Mar. 8, 2004, now Pat. No. 7,428,669.

(60) Provisional application No. 60/527,853, filed on Dec. 7, 2003.

(51) Int. Cl.
*G06F 11/00* (2006.01)

(52) U.S. Cl. ..................... 714/704; 714/774

(58) Field of Classification Search .......... 375/222, 375/295; 714/704, 774, 701, 785
See application file for complete search history.

(56) References Cited

U.S. PATENT DOCUMENTS

| | | | |
|---|---|---|---|
| 4,733,395 A | 3/1988 | Gelbrich et al. | |
| 4,901,319 A | 2/1990 | Ross | |
| 5,023,872 A | 6/1991 | Annamalai | |
| 5,181,198 A | 1/1993 | Lechleider | |
| 5,450,420 A | 9/1995 | An et al. | |
| 5,510,917 A | 4/1996 | Corke et al. | |
| 5,511,119 A | 4/1996 | Lechleider | |

(Continued)

FOREIGN PATENT DOCUMENTS

DE    4444312    2/1996

(Continued)

OTHER PUBLICATIONS

Non-Final Office Action for U.S. Appl. No. 11/336,113 Mailed Nov. 12, 2008, 23 pages.

(Continued)

*Primary Examiner*—David Ton
(74) *Attorney, Agent, or Firm*—Blakely, Sokoloff, Taylor & Zafman

(57) ABSTRACT

Adaptive FEC coding is used to adjust the codeword composition of FEC codewords in a communication system. A codeword composition ratio may be adjusted in response to variance of a measured transmission error value from a target transmission error value in the system. The codeword composition ratio may be any quantity or value that represents the relation between the payload and parity bytes in the applicable FEC coding scheme. Adjustment of the codeword composition ratio may be adjusting parameters such as the N, K and/or R values in ADSL1 systems or the INP and/or maximum interleaving delay values in ADSL2 systems. A controller may be used to monitor, analyze and adjust the various values used in adaptively managing FEC coding. The present invention may be implemented in a transmission system in which a transmitter transmits data to a receiver via a transmission channel, such as a DSL system.

20 Claims, 8 Drawing Sheets

U.S. PATENT DOCUMENTS

| | | | |
|---|---|---|---|
| 5,533,012 | A | 7/1996 | Fukasawa et al. |
| 5,541,955 | A | 7/1996 | Jacobsmeyer |
| 5,621,768 | A | 4/1997 | Lechleider |
| 5,901,205 | A | 5/1999 | Smith et al. |
| 6,067,646 | A | 5/2000 | Starr |
| 6,147,963 | A | 11/2000 | Walker et al. |
| 6,240,126 | B1 | 5/2001 | Ohashi et al. |
| 6,272,652 | B1 | 8/2001 | Starr |
| 6,310,909 | B1 | 10/2001 | Jones |
| 6,449,288 | B1 | 9/2002 | Chari et al. |
| 6,507,608 | B1 | 1/2003 | Norrell |
| 6,536,001 | B1 | 3/2003 | Cai et al. |
| 6,546,509 | B2 | 4/2003 | Starr |
| 6,597,745 | B1 | 7/2003 | Dowling |
| 6,598,188 | B1 | 7/2003 | Locke et al. |
| 6,629,249 | B2 | 9/2003 | Gonzalez |
| 6,636,603 | B1 | 10/2003 | Milbrandt |
| 6,704,351 | B1 * | 3/2004 | Ott et al. ............ 375/222 |
| 6,751,255 | B1 | 6/2004 | Reuven et al. |
| 6,940,973 | B1 | 9/2005 | Yeap et al. |
| 6,967,996 | B1 * | 11/2005 | Cai et al. ............ 375/222 |
| 7,110,467 | B2 * | 9/2006 | Mitlin et al. ........... 375/295 |
| 7,123,651 | B2 * | 10/2006 | Altekar et al. ......... 375/222 |
| 7,131,038 | B2 * | 10/2006 | Mitlin et al. .......... 714/708 |
| 7,386,040 | B1 * | 6/2008 | Cai et al. ............. 375/222 |
| 2003/0072380 | A1 | 4/2003 | Huang |
| 2003/0086362 | A1 | 5/2003 | Hasegawa et al. |
| 2003/0086514 | A1 | 5/2003 | Ginis et al. |
| 2003/0235245 | A1 | 12/2003 | Erdogan et al. |
| 2004/0086064 | A1 | 5/2004 | Van Acker et al. |
| 2004/0109546 | A1 | 6/2004 | Fishman |
| 2005/0052988 | A1 | 3/2005 | Tsatsanis et al. |
| 2005/0053229 | A1 | 3/2005 | Tsatsanis et al. |
| 2005/0129218 | A1 | 6/2005 | Kimble et al. |
| 2005/0152385 | A1 | 7/2005 | Cioffi |
| 2005/0195892 | A1 | 9/2005 | Ginis et al. |
| 2006/0056305 | A1 | 3/2006 | Oksman et al. |
| 2006/0109779 | A1 | 5/2006 | Shah et al. |
| 2006/0133519 | A1 | 6/2006 | Tsatsanis et al. |
| 2006/0146945 | A1 | 7/2006 | Chow et al. |

FOREIGN PATENT DOCUMENTS

| | | |
|---|---|---|
| GB | 2315392 | 1/1998 |
| WO | WO 95/31867 | 11/1995 |
| WO | WO 01/35611 | 5/2001 |
| WO | WO 2004/027579 | 4/2004 |
| WO | WO 2005/094052 | 10/2005 |

OTHER PUBLICATIONS

State Intellectual Property Office of the P.R. China, "Notification of the First Office Action" Chinese Application No. 200480040960.5, Mar. 27, 2009.

"International Search Report and Written Opinion", International Application No. PCT/IB2006/000884, 13 pgs. mailed Sep. 4, 2006.

"International Search Report and Written Opinion", International Application No. PCT/IB2006/000759, 16 pgs. mailed Aug. 16, 2006.

"International Search Report and Written Opinion", International Application No. PCT/IB2006/000499, 12 pgs. mailed Jun. 9, 2006.

"International Search Report and Written Opinion", PCT Application No. PCT/US2007/013393, 15 pgs., (Jan. 4, 2008).

Cendrillon, R, et al., "Improved Linear Crosstalk Precompensation for DSL", *Acoustics, Speech and Signal Processing*, 2004. Piscataway, NJ, US, vol. 4., (May 17, 2004), pp. 1053-1056.

Cendrillon, Raphael, et al., "Partial Crosstalk Cancellation Exploiting Line and Tone Selection in VDSL" (Sep. 2003).

Cendrillon, et al., "Partial Crosstalk Cancellation for Upstream VDSL", *EURASIP Journal on Applied Signal Processing*, (Oct. 2004), 16 pgs.

Cendrillon, et al., "Partial Crosstalk Precompensation for Downstream VDSL", Published by Elsevier North-Holland, Inc.; vol. 84 issue 11; ISSN:0165-1684, (Nov. 2004), 15 pgs.

Cendrillon, et al., "The Linear Zero-Forcing Crosstalk Canceller is Near-optimal in DSL Channels", *IEEE Global Communications Conference (Globalcom)*; Dallas; Texas, (Dec. 2004), 5 pgs.

Cheong, Minho, et al., "Computationally Efficient Cancellation of Partially-overlapped Crosstalk in Digital Subscriber Lines", Globalcom 2005; St. Louis, Missouri; Nov. 28-Dec. 2, (2005), 5 pgs.

Cioffi, John M., et al., "Canonical Packet Transmission on the ISI Channel with Guassian Noise", *Global Telecommunications Conference*; London, UK., XP-010220148, (Nov. 18, 1996), 1405-1410.

Cioffi, John M., et al., "Dynamic Spectrum Management", *A methodology for providing significantly higher broadband capacity to the users*, Telektronikk, (Apr. 2004), 12 pgs.

Cioffi, John M., "Dynamic Spectrum Management Report", *Committee T1—Telecommunications Working Group NAI*, San Francisco, California (Feb. 21, 2005), 75 pgs.

Cioffi, John, et al., "MIMO Channel Measurement Test Plan" (Feb. 17, 2003).

Cioffi, John, "The Fast Adaptive Rotors RLS Algorithm", *IEEE Transactions on Acoustics, Speech and Signal Processing*, New York, NY, US vol. 38, No. 4, (Apr. 1, 1990), pp. 631-653.

Cuypers, et al., "Combined per tone equalization and receiver windowing in DSL receivers: WiPTEQ", Elsevier Science Publishers, Amsterdam, NL, vol. 85, No. 10, (Oct. 2005), pp. 1921-1942.

Cuypers, et al., "Combining Per Tone equalization and windowing in DMT receivers", *IEEE International Conference on Acoustics, Speech and Signal Processing (ICASSP)*; Orlando, Florida, (Sep. 2002).

European Patent Office, "First Office Action", European Application No. 04801294.2, (Jun. 27, 2008), Whole Document.

Fang, Jeannie L., "Modeling and Characterization of Copper Access Systems", (May 31, 2002).

Fischer, "Appendix E of "Precoding and Signal Shaping for Digital Transmission"", *Wiley-IEEE Press*, ISBN: 978-0-471-22410-5, (Aug. 2002), 10 pgs.

Forouzan, et al., "Generalized Iterative Spectrum Balancing and Grouped Vectoring for Maximal Throughput of Digital Subscriber Lines", *Globalcom 2005*; St. Louis, Missouri, (Dec. 2, 2005), 5 pgs.

Ginis, George, et al., "A Multiuser precoding scheme achieving crosstalk cancellation with application to DSL systems", *Signals, Systems, and Computers, 200. IEEE* vol. 2, (Oct. 29, 2000), pp. 1627-1631.

Ginis, George, et al., "Alien Crosstalk Cancellation for Multipair Digital Subscriber Line Systems", vol. 2006, Article ID 16828 (2006).

Ginis, George, et al., "Blind adaptive MIMO decision feedback equalization using givens rotations", *IEEE International Conference on Communications*, New York, NY, US, vol. 1 of 5., (Apr. 28, 2002), pp. 59-63.

Ginis, George, et al., "Vectored Transmission for Digital Subscriber Line Systems", *IEEE Journal*, vol. 20 No. 5, Piscataway, NJ, US., XP-011065493, (Jun. 2002), pp. 1085-1104.

Harashima, et al., "Matched-transmission technique for channels with intersymbol interference", *IEEE Transactions on Communication*; vol. COM-20, No. 4, (Aug. 1972), 774-780.

Im, Gi-Hong, et al., "FEXT Cancellation for Multi-Carrier Transmission System", (Apr. 11, 2002).

Laroia, et al., "A Simple and Effective Precoding Scheme for Noise Whitening in Intersymbol Inference Channels", *IEEE Trans. on Communication*; vol. 41, (Oct. 1993), 1460-1463.

Lee, et al., "Binder MIMO Channels", *submitted to IEEE Journal on Selected Areas in Communications*, Reference No. XP-001143167, (Jun. 2002), 20 pgs.

Louveaux, J., et al., "Downstream VDSL channel tracking using limited feedback for crosstalk precompensated schemes", *Acoustics, Speech and Signal Processing* 2005, (Mar. 18, 2005), pp. 337-340.

Magesacher, et al., "Exploiting the Common-Mode Signal in xDSL", *Proc. 12th European Signal Processing Conference (EUSIPCO 2004)*, Vienna, Austria, Sep. 7-10, 2004., (Sep. 2004), 4 pgs..

Otte, M, et al., "Complex CORDIC-like algorithms for linearly constrained MVDR beamforming", *Broadband Communications*, 2000. Piscataway, NJ, US, (Feb. 15, 2000), pp. 97-104.

Patent Cooperation Treaty, "International Search Report and Written Opinion", International Application No. PCT/IB2006/000482, Whole Document. (mailed May 18, 2006).

Paul, Clayton R., "Analysis of Multiconductor Transmission Lines", *John Wiley & Sons*. Chapters 2 and 3, (1994), 46-186.

Song, Kee Bong, et al., "Dynamic Spectrum Management for Next-Generation DSL Systems", IEEE Communications Magazine; Reference No. XP-001132769, (Oct. 2002), 9 pgs.

Tomlinson, "New Automatic Equaliser Employing Modulo Arithmetic", *Electr. Letters*; vol. 7, (Mar. 1971), 138-139.

Voyan Technology, "Vectoring Techniques for Multi-Line 10MDSL Systems" (Aug. 2002).

Wei, "Generalized Square and Hexagonal Constellations for Intersymbol-Interference Channels with Generalized Tomlinson-Harashima Precoders", *IEEE Transactions on Communications*, vol. 42, No. 9, (Sep. 1994), 9 pgs.

International Search Report from International Application No. PCT/IB2004003961, mailed Jul. 4, 2005, pp. 1-4.

ITU-T Recommendation G.992.1, Asymmetric digital subscriber line (ADSL) transceivers, Series G, as provided by International Searching Authority, Reference No. XP-002321806, Jun. 1999, 14 pgs.

Written Opinion of the International Search Authority, International Application No. PCT/IB2004003961, Jan. 2004, pp. 1-6.

Cioffi, John, "Dynamic Spectrum Management", Alcatel DSL Forum presentation; Paris, France, (Nov. 11, 2003), pp. 1-47.

Cioffi, John, "Dynamic Spectrum Management", Deutsche Telecom DSL presentation; Darmstadt, Germany, (Oct. 6, 2003), pp. 1-37.

Cioffi, John, "Dynamic Spectrum Management", IEEE Globalcom presentation; San Francisco, California, (Dec. 3, 2003), pp. 1-30.

Cioffi, John, "Dynamic Spectrum Management", Telecom Italia presentation; Turin, Italy, (Nov. 19, 2003), pp. 1-32.

Cioffi, John, "Dynamic Spectrum Management", Korea Telecom DSL presentation; Seoul, Korea, (Sep. 24, 2003), pp. 1-38.

Cioffi, John M., "Dynamic Spectrum Management Report", Broadband World Forum; London, England, (Sep. 10, 2003), pp. 1-17.

Cioffi, John, et al., "Low-Latency Impulse Elimination", Committee T1, Working Group T1E1.4 (DSL Access); Atlanta GA, (Apr. 8, 2002), pp. 1-13.

Moulin, F., et al., "Discrete-multitone-based ADSL and VDSL systems performance analysis in an impulse noise environment", IEEE Proceedings: Sci Meas. Technol. vol. 150 No. 6, Reference No. XP-006024286, (Nov. 3, 2003), pp. 273-278.

Nedev, N., et al., "Comparison between Interleaving and Multiple DMT Symbols per Respectfully Submits Codeword in ADSL Systems", Globalcom 2002—IEEE Global Telecommunications Conference; Taipei, Taiwan, Reference No. XP-010636152, (Nov. 17, 2002), pp. 2265-2269.

Starr, et al., "DSL Advances", Chapters 3, 7, and 11; Prentice-Hall, (2003), Ch. 3 (pp. 41-98); Ch. 7 (pp. 184-244); Ch. 11 (pp. 1-53).

Starr, et al., "Information comment solicitation on ITU FEC INP submission for ADSL2", Committee T1, Working group T1E1.4 (DSL Access); Vancouver, BC, (Feb. 23, 2004), Paper (pp. 1-7); PowerPoint Slides (pp. 1-9).

Starr, et al., "Proposed revisions to G.992.4 and G.992.3&5 regarding impulse noise protection", Study group 15, ITU—Telecommunication Standardization Sector; San Francisco, California, (Mar. 8, 2004), pp. 1-6.

Veithen, D., et al., "A 70Mb/s Variable-Rate DMT-Based Modem for VDSL", 1999 IEEE International Solid-State Circuits Conference; ISSCC99/Session 14/Paper TP 14.6., Reference No. XP-002184687, (Feb. 15, 1999), pp. 248-249.

Office Action; European Patent Application No. 04801294.2; received via facsimile Aug. 1, 2008, pp. 1-2.

Office Action for U.S. Appl. No. 10/795,593 mailed Mar. 21, 2007; 12 pgs.

Office Action for U.S. Appl. No. 10/795,593 mailed Oct. 22, 2007; 12 pgs.

Examiner's Report for Australian Application No. 2004298118 mailed Jan. 23, 2009, 3 pgs.

Examiner's Report for Australian Application No. 2004298118 mailed Nov. 23, 2009, 2 pgs.

Office Action for Chinese Application No. 200480040960.5 mailed Jul. 24, 2009, 11 pgs.

Office Action for European Application No. 04801294.2 mailed Mar. 11, 2009, 5 pgs.

\* cited by examiner

ADAPTIVE FEC CODEWORD MANAGEMENT

CROSS-REFERENCE TO RELATED APPLICATIONS

This application is a divisional of U.S. patent application Ser. No. 10/795,593, filed Mar. 8, 2004, now U.S. Pat. No. 7,428,669 which claims the benefit of priority under 35 U.S.C. §119(e) of U.S. Provisional No. 60/527,853 filed on Dec. 7, 2003, entitled DYNAMIC MANAGEMENT OF COMMUNICATION SYSTEM, the disclosure of which is incorporated herein by reference.

BACKGROUND OF THE INVENTION

1. Field of the Invention

This invention relates generally to methods, systems and apparatus for managing digital communications systems. More specifically, this invention relates to dynamically controlling system parameters that affect performance in communication systems such as DSL systems.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice band analog communication. In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

Impulse noise, other noise and other sources of error can substantially impact the accuracy of data transmitted by ADSL and other communications systems. Various techniques have been developed for reducing, avoiding and/or repairing the damage done to data during transmission by such error. These error reduction/avoidance/repair techniques have performance costs for a communication system in which they are used. As is well known in the art, interleaving can reduce and/or eliminate adverse error effects by distributing errors generated by noise and other sources during transmission. Interleaving is a coding technique commonly used to increase the performance of transmission systems by decreasing errors in the system. Prior to transmission, interleaving rearranges transmission data to improve the error-correction performance of redundancy coding techniques by spreading errors out over more bytes of data.

The interleave "depth" is preferably defined conceptually and most generally as the distance between bits that originally were adjacent to one another. The interleave depth is altered by varying the distance between originally adjacent bits. Increasing the interleave depth improves the error correction capability of a given system. However, as discussed in more detail below, interleaving increases the transmission latency (that is, the time required for data to traverse the end-to-end transmission path) of the system. The interleave depth also may be a numerical value D that will be explained in more detail below.

One redundancy coding technique used in connection with interleaving is forward error correction (FEC) employing Reed-Solomon encoding, which is well known to those skilled in the art. FEC takes data to be transmitted by a user (referred to as "payload" data) and generates codewords that contain the "payload" data bytes and parity bytes (which also may be referred to as "redundancy" bytes in ADSL standards and various other publications), which assist a system receiver in checking for errors in transmitted data. These FEC codewords are inputs to a programmed transmitter interleaver.

Reed-Solomon codewords are made up of K data or information bytes (the user's payload data) and R parity bytes, totaling N bytes in each codeword (that is, K+R=N). Typically N must be 255 or less and DSL systems use only even numbers. The ADSL1 standard describes the methods used in FEC coding for that type of system and explains the use of FEC encoding and interleaving in detail. As noted in the ADSL1 standard, the FEC coder takes in S mux data frames of $K_{mux}$ bytes of payload data and appends R FEC redundancy bytes to produce the FEC codeword of length $N_{FEC}=S\times K_{mux}+R$ bytes. The FEC output data frames contain $N_{FEC}/S$ bytes, which is an integer.

In communication systems such as ADSL that use DMT techniques, each codeword may contain all or part of one or more DMT symbols. The variable S is used to refer to the number of DMT symbols present in each FEC codeword. Typically S=1 for fast transmission (low delay mode), since spanning more than one symbol introduces extra delay. In DSL, S can be a rational fraction as low as ⅓ (or effectively even lower in VDSL standards) and can be greater than 1. In some embodiments of the present invention, a modem may compute its S value based on other parameters.

The N, K, S and D parameters are directly specified by modem pairs in ADSL. In ADSL1 (or G.992.1/2), the downstream FEC settings for N, R, S, and D are determined by the transmitter (or ATU-C), while in ADSL2 (or G.992.3/4/5) the downstream FEC settings N, R, S and D and related parameters are determined by the downstream receiver (ATU-R) during loading. Upstream FEC settings are set by the ATU-C in both ADSL1 and ADSL2. The setting of S allows a modem the flexibility to match a the requested data rate with whatever internal overhead it determines it should use. If the modem also is told S, the modem might be put into a quandary of incompatible or otherwise conflicting requirements. Earlier systems have not used adaptive programming of the N, K and D parameters. While one system implemented by Alcatel currently allows 3 choices for D only, disadvantageously, the 2 choices useful for addressing impulse noise and the like have excessive delays and cause higher layer protocols to be less efficient.

Interleaving FEC codewords introduces a transmission delay (or "latency"), which can be a significant drawback in DSL systems. The latency associated with interleaving can constitute a significant portion of a system's overall latency. High latency can have a substantial negative impact on system performance, especially when the system is operating at high data transmission rates. The impact is especially pronounced for systems where many end-to-end transmissions are required to accomplish a task (for example, systems utilizing TCP/IP to send a large file). Accordingly, providers generally strive to minimize latency through their systems, though still tolerate it to gain the benefits of interleaving and offset adverse error effects. Therefore, it is desirable to minimize the interleaving necessary to achieve desired performance.

Some prior art systems use "adaptive" interleaving, which allows different interleaving depths to be applied to different transmissions. Adaptive interleavers are known to those skilled in the art. U.S. Pat. Nos. 4,901,319 and 6,546,509 describe adaptive interleaving systems, which adjust for various channel problems, noise and other sources of error. However, they require changes to the interleaving depths (denoted by the variable D) to be applied to different transmissions, which in turn alters the latency of the system.

Where the interleave depth is adaptively increased to reduce the error rate in earlier systems, the latency of the system increases, adversely affecting system performance and possibly leading to other performance-related problems. In addition, increasing interleave depth (and thus latency) may violate standards relating to prescribed latencies that are permitted for operation of a transceiver in an ADSL system. In some cases, increasing interleave depth even a small amount may compel large increases in latency due to the fact that some standards have discrete latency values. Therefore, a small, adaptive "bump up" in interleave depth by an adaptive interleaver may lead to a disproportionately large increase in latency, again a highly undesirable consequence of error correction.

ADSL standards prescribe some latencies. For example, in most implementations of ADSL1, the available latency delays typically are 4 ms and 24 ms (though occasionally a third option of 16 ms might be available) and are set by the DSLAM manufacturer's default for both upstream and downstream. In ADSL2 and ADSL2+(G.992.5), the available latencies are set by the operator between 2 ms and 20 ms using the element management system (a data acquisition system, described in detail in G.997.1, that allows a service provider to implement control parameters such as the INP value and maximum interleaving delay), which conveys the preference to the line's modems, including the downstream receiver (ATU-R). That receiver selects the N, R and D parameters using a minimum impulse noise protection value or impulse strength indicator (called INP in G.992.3/4/5 and the related G.997.1), depending on vendor-imposed default options (sometimes referred to as "profiles"). The maximum interleaving delay and INP values in the G.992.3/4/5 and G.997.1 standards (which are incorporated herein in their entireties by reference for all purposes) however must be supplied upon initialization of the modem and there is no way to know any error measurements before data transmission. Emerging VDSL standards also use Reed Solomon codes and may have INP/Delay and/or N, R and D specification capability, depending on their evolution. Also, SHDSL standards may use bonding and Reed Solomon codes also and the same basic methods apply there to the setting of the N, R and D parameters or their equivalents like INP/Maximum Interleaving Delay. However, as can be seen from the available latency values in these systems, having to go to a higher latency as a result of adaptive interleaving and the like can mean a substantial increase in transmission delay.

Systems, methods and techniques that permit adjustment of a communications system to compensate for changing channel and other conditions, including noise effects, while minimizing and/or preserving the latency characteristics of the system would represent a significant advancement in the art. Moreover, maintaining a fixed latency delay for interleaving of data in an ADSL system, while adaptively adjusting the system to meet one or more error rate requirements would likewise constitute a significant advancement in the art.

BRIEF SUMMARY OF THE INVENTION

Adaptive FEC coding is used to adjust the codeword composition of FEC codewords in a communication system. A codeword composition ratio may be adjusted in response to variance of a measured transmission error value from a target transmission error value in the system. The codeword composition ratio may be any quantity or value that represents the relation between the payload and parity bytes in the applicable FEC coding scheme. Adjustment of the codeword composition ratio may be adjusting parameters such as the N, K and/or R values in ADSL1 systems or the INP and/or maximum interleaving delay values in ADSL2 systems. A controller may be used to monitor, analyze and adjust the various values used in adaptively managing FEC coding. The present invention may be implemented in a transmission system in which a transmitter transmits data to a receiver via a transmission channel, such as a DSL system.

In some embodiments of the present invention, a controller for an adaptive FEC coder uses a codeword composition ratio (CCR) that is a quantity or value that represents the relation between the payload and parity bytes in the applicable FEC coding scheme. The FEC coder is used in a communication system in which a transmitter sends data to a receiver via a channel using FEC coding, interleaving and an original transmission latency. The controller includes means, such as a transmission error value monitor, coupled to the communication system for acquiring a measured transmission error value (MEV). Coupled to this monitor is means for analyzing the MEV relative to a target transmission error value (TEV). Means for generating one or more control signals is coupled to the analyzing means and generates appropriate output control signals that are used to adjust the CCR and/or the interleave depth in the transmission system.

A method according to one or more embodiments of the present invention includes selecting a CCR and transmitting data using that codeword composition and the FEC coding scheme. An MEV is acquired and analyzed relative to a TEV. If the MEV differs sufficiently from the TEV, the CCR can be adjusted to compensate for the difference. Adjusting the CCR can be accomplished by changing one or more of the codeword composition parameters (such as the N, K and/or R values in an ADSL1 system, or the INP and/or maximum interleaving delay values in an ADSL2 system). If desired, the acquisition, analysis and adjustment steps can be repeated one or more times to permit updating of the communication system performance to address changing conditions and operational behavior.

A transmission system can implement the controller and/or utilize one or more of the methods of the present invention, as will be appreciated by those skilled in the art. The controller can be coupled to an FEC coder in a transmitter and to another system components, such as a receiver and/or decoder. Data acquired by the controller can be used to generate control signals that instruct the transmitter and/or receiver coding-related components to adjust their operation.

The controller in these embodiments may be a dynamic spectrum manager or similar entity residing within or outside a central office. The transmission error value(s) used in embodiments of the present invention can be based upon or be computed from the bit error rate, errored seconds, errored minutes, the number of code violations over a fixed period of time, the signal-to-noise ratio measured at the receiver, the TCP/IP or other protocol throughput at a higher level and/or other quantities obvious to those skilled in the art that represent the amount or level of error detectable in a given system.

Further details and advantages of the invention are provided in the following Detailed Description and the associated Figures.

BRIEF DESCRIPTION OF THE SEVERAL VIEWS OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
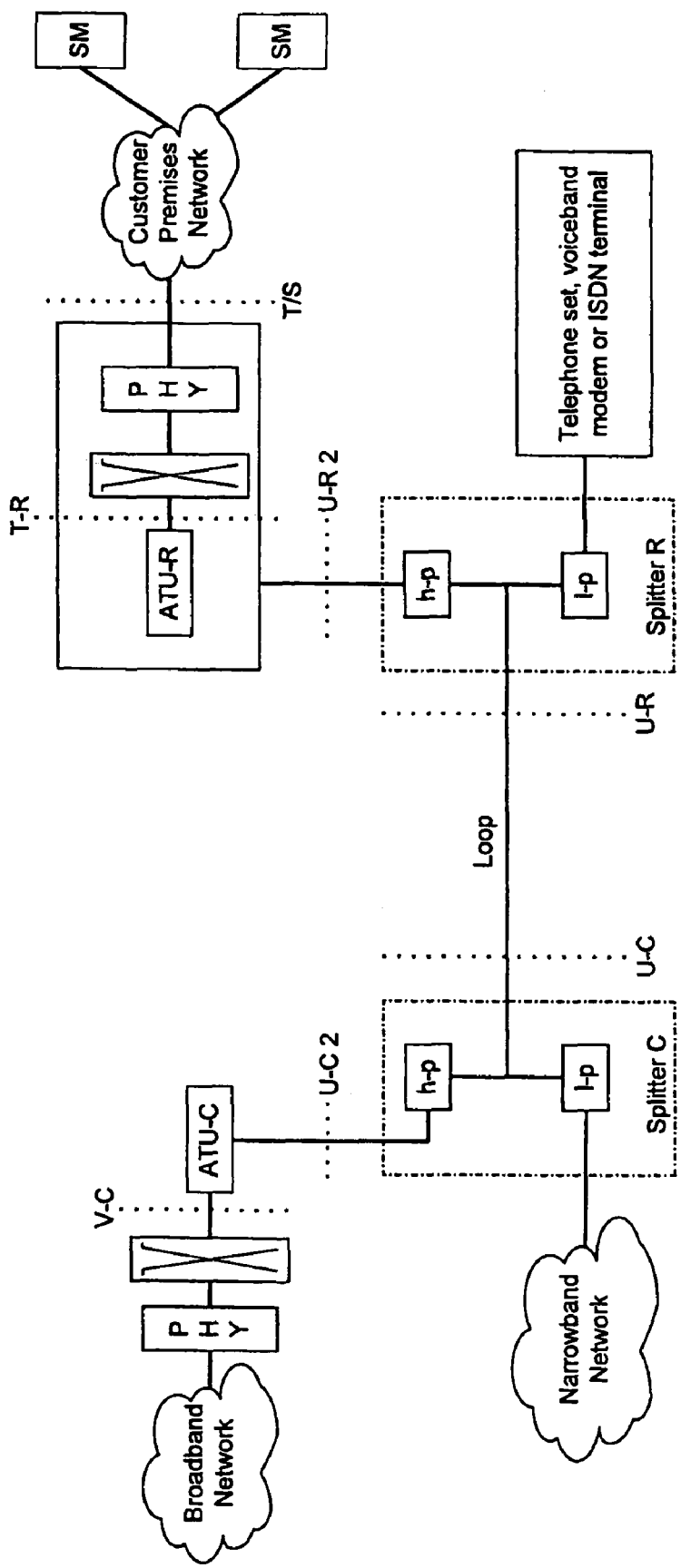
FIG. 1 is a schematic block diagram of an ADSL reference model system from the ADSL1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

The present invention allows for adjustments to the transmission error rate of a communications system using data codewords, without affecting the latency of data transmission through the system between a transmitter and a receiver. This transmission error rate adjustment is accomplished using changes to a codeword composition ratio (for example, by changing at least one codeword length parameter) when a measured transmission error value (or MEV) differs sufficiently from a target transmission error value (or TEV). For example, when the measured bit error rate (BER) of transmissions in a communication system differs sufficiently from a target BER (for example, where the measured BER is sufficiently above a threshold maximum error rate), the composition of codewords used in FEC/interleaving is adjusted to meet the target BER, while leaving the latency unaffected (or possibly reduced).

The transmission error value(s) used in the present invention can be one or more of the following (or can be based upon one or more of the following)—the bit error rate, errored seconds, errored minutes, the number of code violations over a fixed period of time, the signal-to-noise ratio measured at the receiver, the TCP/IP or other protocol throughput at a higher level and/or other quantities obvious to those skilled in the art that represent the amount or level of error detectable in a given system. The codeword parameters are adaptively adjusted (for example, by a signal sent by a computer-implemented controller), resulting in an increase or decrease in data rate, until an acceptable error rate is achieved (while also, in some embodiments of the present invention, meeting power, margin and/or other system operating requirements and/or goals).

As described in more detail below, a controller implementing one or more embodiments of the present invention can be a dynamic spectrum manager or spectrum management center and can be a computer-implemented device or combination of devices that monitors the appropriate transmission error value(s). The controller may directly or indirectly dictate/require changes in codeword composition by users coupled to the controller or may only recommend changes to those users. (The phrases "coupled with" and "coupled to" and the like are used herein to describe a connection between two elements and/or components and are intended to mean coupled either directly together, or indirectly, for example via one or more intervening elements.) In some embodiments, transmitters to which the controller is coupled all reside in the same location (for example, a DSL central office) and may or may not share a common binder for their respective transmission channels. The structure, programming and other specific features of a controller usable in connection with embodiments of the present invention will be apparent to those skilled in the art after reviewing the present disclosure.

The present invention changes the structure of the codewords provided for interleaving of data to protect against the adverse effects of errors without increasing the transmission latency. The following values and/or variables are used in the ADSL1 standard:

| Value/variable | Description |
|---|---|
| K | Number of payload data bytes in each mux data frame, which is a DMT symbol (FIG. 2, Point A) |
| S | Number of DMT symbols per codeword |
| (S × K) | Number of payload data bytes per codeword |
| R | Number of parity (or redundancy) bytes per codeword |
| $N_{FEC}$ = (S × K) + R | Total number of bytes (combined payload data and parity/redundancy) per codeword |
| $N_I$ = N/S | Number of bytes per FEC output data frame (FIG. 2, Point B) |
| D | Interleaving depth in codewords |

The following examples of embodiments of the present invention may use ADSL systems as exemplary communications systems. Within these ADSL systems, Reed-Solomon coding is used for FEC. However, as will be appreciated by those skilled in the art, embodiments of the present invention may be applied to various communications and coding systems and the invention is not limited to any particular system. The present invention can be used in any data transmission system that uses codeword-type data structures.

Figure 2:
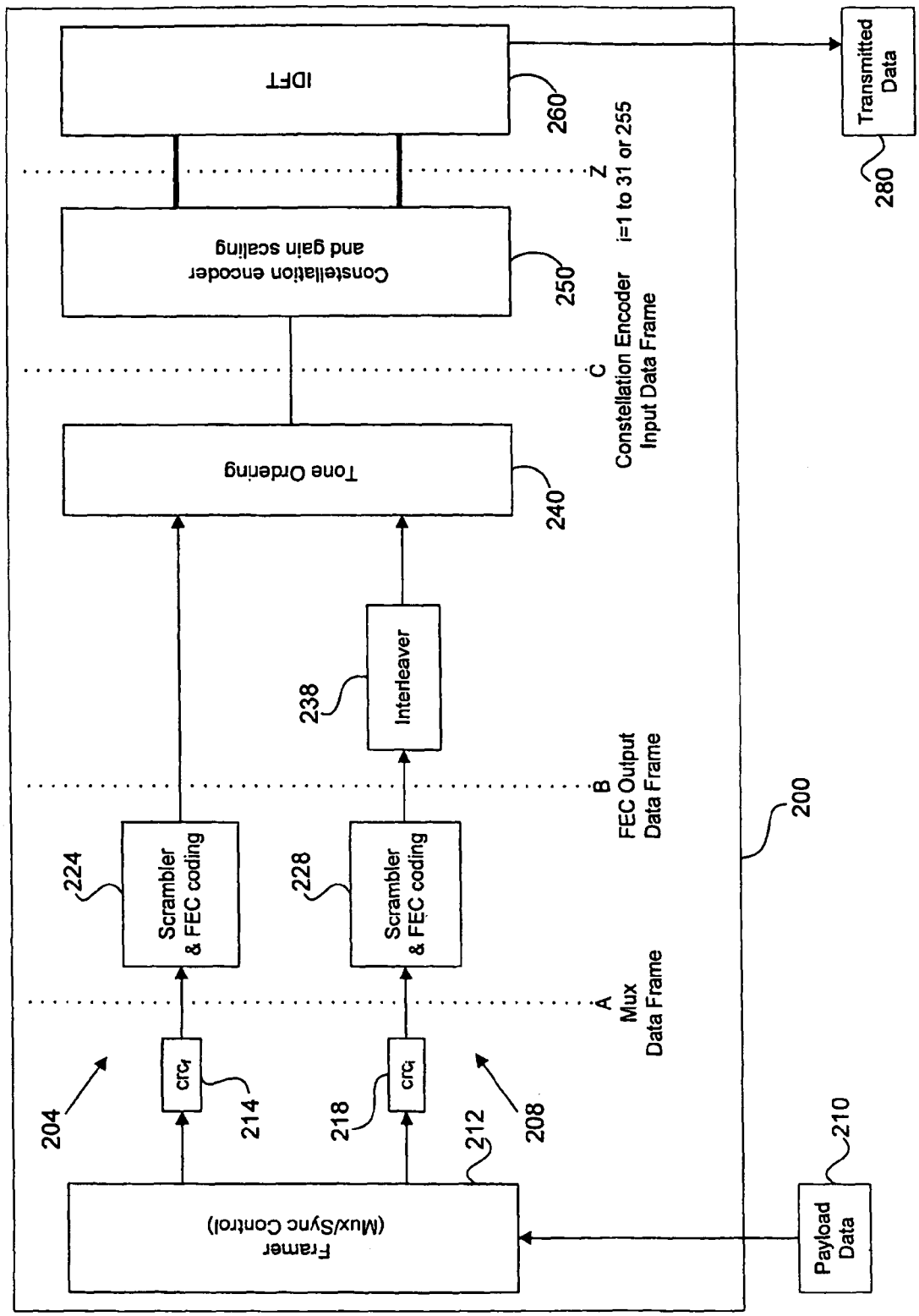
FIG. 2 is a schematic block diagram showing the relevant portions of the transmitter reference models from the ADSL1 standard for ATU-R and ATU-C transmitters using synchronous and asynchronous data transport.

FIG. 1 shows an ADSL reference model system from the ADSL1 standard (G.dmt or G.992.1), which is incorporated herein in its entirety by reference for all purposes. Similar figures could be composed based on one or more DSL standards that may or may not include splitters, such as ADSL-Lite (G.992.2), ADSL2 (G.992.3), ADSL2-Lite (G.992.4), ADSL2+(G.992.5) and the G.993.x emerging VDSL standards, as well as the G.991.1 and G.991.2 SHDSL standards, all with and without bonding. In particular, when splitters are not used, the types of intermittent noise for which the invention disclosed herein provides protection may be more prevalent. FIG. 2 shows the relevant portions of the transmitter reference models from the ADSL1 standard for ATU-R and ATU-C transmitters using synchronous and asynchronous data transport. These models are well known to those skilled in the art.

Figure 3:
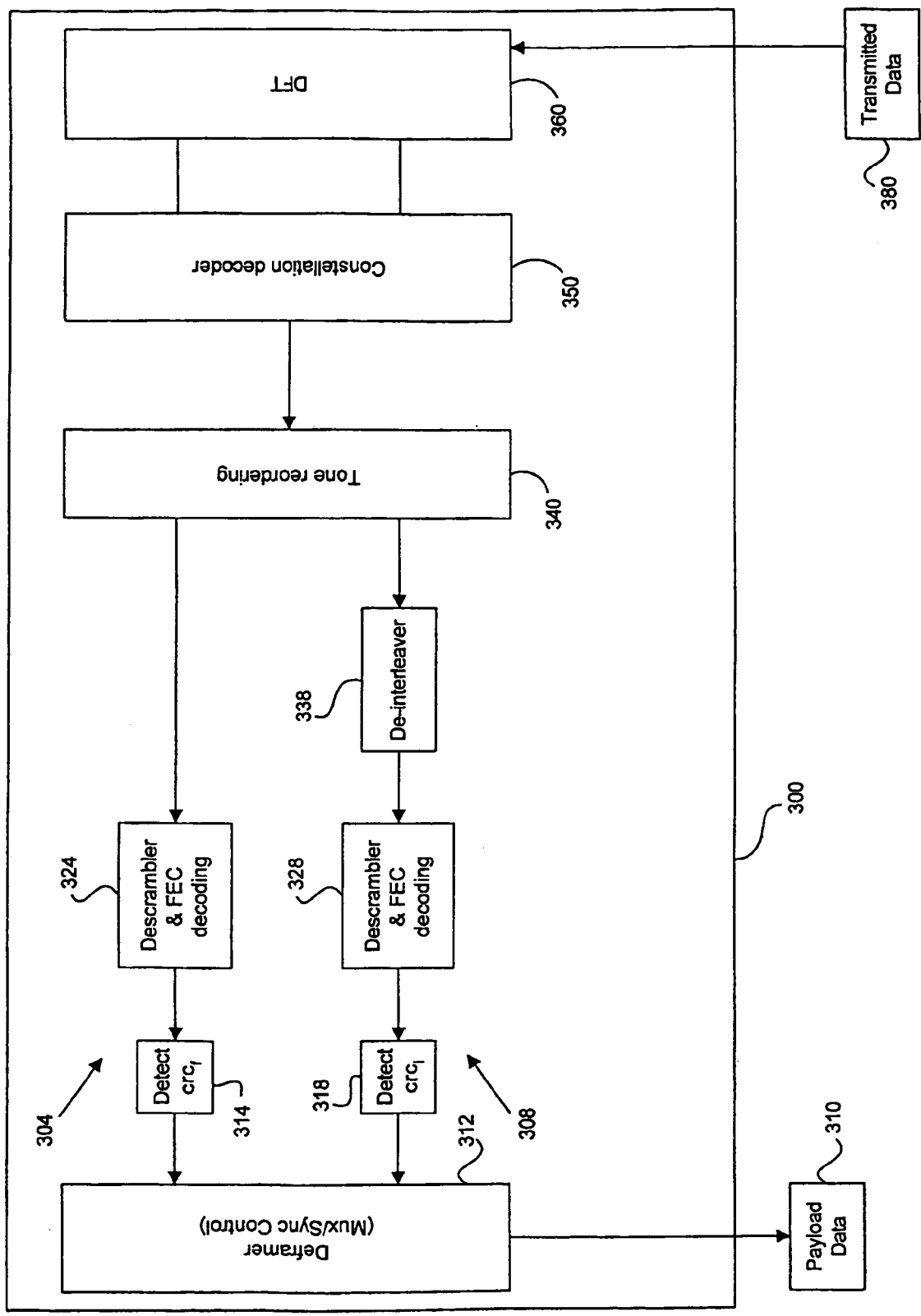
FIG. 3 is a schematic block diagram showing the relevant portions of a receiver usable with one or more embodiments of the present invention.

The ADSL1 standard does not specify receiver operation in as much detail as the transmitter, permitting a great deal of flexibility. The relevant portions of a typical design of a receiver that can be used in connection with the transmitter of FIG. 2 are illustrated in FIG. 3. The functional blocks depicted in both FIGS. 1-3 may be physically performed by specialized circuitry or be programmed into a digital signal processor or other processor or by a combination of such elements. For example, combinations of blocks may be housed and operate within a single modem/transceiver.

Many of the receiver functions (for example, the demodulator, decoder, descrambler and de-interleaver) perform the inverse of their related transmitter functions. Some components may be unique to the receiver (for example, a time domain equalizer, a frequency domain equalizer, and an automatic gain control). The job of some of the receiver functions in an ADSL modem is to recover and process the transmitted signal for presentation to the demodulator. The demodulator's task is to retrieve the digital bits that form the payload data of the transmitted message.

In FIG. 2 the payload data 210 provided to the transmitter 200 is supplied to a framer (multiplexer and sync control) 212. Data that is to be handled in a "fast" data path 204 in an ADSL1 system (without interleaving) is sent for assignment of a fast cyclic redundancy code prefix ($crc_f$) at 214 and then on to a scrambler and FEC coder 224. Data to be interleaved is sent through an interleave path 208 for assignment of an interleaving cyclic redundancy code prefix ($crc_i$) at 218 and then on to a scrambler and FEC coder 228. The $crc_i$ prefix and payload data are configured into Reed-Solomon codewords in coder 228 and sent to the interleaver 238 for interleaving. ADSL employs FEC coding based on Reed-Solomon codes using GF(256); the use of GF(256) permits the Galois field elements to be represented by bytes, and codewords may have up to 255 bytes. The bits of a codeword are allocated among the sub-carriers (during tone ordering at 240 in FIG. 2) and, after constellation encoding in encoder 250, are presented for modulation (for example, using an inverse discrete Fourier transform, for example, at 260 in FIG. 2) to form an ADSL symbol for transmission as transmitted data 280. As noted in the ADSL1 standard, the FEC coder 228 takes in S mux data frames from Point A and appends R FEC redundancy bytes to produce the FEC codeword of length $N_{FEC}=(S \times K+R)$ bytes. The FEC output data frames at Point B thus contain $N_I=N_{FEC}/S$ bytes, which is an integer.

It should be noted that $N_{FEC}$ and $N_I$ contain different numbers of bytes whenever $S \neq 1$ in ADSL1. However, the ratio of total bytes to payload bytes for each of these different N values is the same, though notation in the ADSL1 standard is confusing since K is not the total number of payload bytes per codeword when $S \neq 1$. S×K is instead. Those skilled in the art will recognize the applicability of the present invention and general principles pertaining to the present invention when discussed in connection with the codeword values K, N and R and their relative proportions. For ease of notation in the following discussion, K will refer generally to the number of payload bytes in each FEC codeword, R will refer generally to the number of redundancy bytes in each FEC codeword, and N will refer generally to the total number of bytes in each FEC codeword.

As noted in the ADSL1 standard, because of the addition of FEC redundancy bytes and data interleaving, the data frames (that is, bit level data prior to constellation encoding) have different structural appearances at the three reference points through the transmitter 200. As shown in FIG. 2, the data framing reference points are Point A (multiplexed, synchronized data after the appropriate CRC has been inserted), Point B (data frames generated at the output of the FEC encoder at the DMT symbol rate, where an FEC block may span more than one DMT symbol period), and Point C (data frames presented to the constellation encoder 250).

The present invention focuses on adjusting one or more codeword parameters outside of the interleaver in a typical communication system. Earlier systems have ignored adaptive codeword generation and adjustment and, instead, have focused only on programming the D parameter alone in the interleaver (and, of these systems, most allow only 2 or 3 choices). Codeword parameters such as the N parameter can be far more important, and have been missed by earlier systems. There has been no interface to program/adapt codewords and these parameters have been fixed in firmware in delivered products (even though some standards allow two modems to tell each other what choices they have in firmware, nothing has been developed in this regard). As will be appreciated by those skilled in the art, embodiments of the present invention typically allow finer tuning of error correction in the communication system in which the present invention is implemented and allow system operators and users to maintain critical performance parameters such as latency, while providing an adaptable operational environment. While changes to the codeword structure produce changes in data rates, latency problems can be reduced or eliminated.

Per the ADSL1 standard, the following coding capability values may be used for R, S and D (the interleaver depth D is measured in codewords, not bytes) in the ATU-C (per the ADSL1 standard) and the ATU-R (per the ADSL1 standard):

| Value | ATU-C | ATU-R |
|---|---|---|
| R | 0, 2, 4, 6, 8, 10, 12, 14, 16 | 0, 2, 4, 6, 8, 10, 12, 14, 16 |
| S | 1, 2, 4, 8, 16 | 1, 2, 4, 8, 16 |
| D | 1, 2, 4, 8, 16, 32, 64 | 1, 2, 4, 8 |

Generally, FEC coding uses parity bits/bytes to permit receiver correction of errors caused by noise and other error-generating phenomena. In an ADSL1 system, a transmitter takes S mux data frames available at Point A of FIG. 2, each mux data frame having K bytes of payload data, and creates FEC output data frames that are presented to the interleaver at Point B. The FEC coder takes the original (S×K) payload data bytes and adds R parity bytes to form a codeword having N total bytes. FEC output data frames having N/S bytes are then output from the FEC coder. The ADSL1 standard provides a detailed description of the framing of data according to that standard.

G.997.1 and the ADSL1 standard define the maximum ADSL latency (line delay) when data is interleaved. This ADSL line delay parameter is the requested transmission delay introduced by interleaving and the FEC process. The delay is defined based on the number of DMT symbols per codeword (S) and interleaving depth (D). In prior practice, the ATU-C and ATU-R chose their S and D parameters so that they were equal to or as close as possible to the requested delay. In the ADSL1 standard, the delay is defined as $(4+(S-1)/4+S*D/4)$ ms. The minimum delay occurs when $S=1$ and $D=1$ (those values' minimums) and is a function of the DMT transmission system and not the interleaving or FEC structure. ADSL2 uses a similar, though not identical formula for the delay.

Using embodiments of the present invention, a desired error rate can be achieved by adjusting one or more of FEC codeword composition parameters, while optimizing DSL use (for example, maximizing the transmission data rate and not increasing latency) within that constraint. In one embodiment of the present invention, shown in FIG. 4, a method 400 commences with communications system transmitting data via a transmission channel between a transmitter and a receiver at step 405. These transmissions use an original codeword composition ratio (CCR), which in the following illustrative discussion is defined as either:

$$CCR = \frac{\text{Payload data bytes}}{\text{Total data bytes}} \text{ OR (Payload bytes)}:\text{(Total bytes)}$$

However, as will be apparent to those skilled in the art, any quantity or value can be used as the CCR as long as it represents the relation between the payload and parity bytes in the applicable FEC coding scheme.

In an ADSL1 system, for example, the CCR could be the ratio of (S×K) to $N_{FEC}$. Adjusting any of the parameters/variables contributing to the relative difference between these quantities will increase or decrease the CCR, which measures the linear reduction in the data rate as the ratio increases or decreases.

One or more transmission error values that represent the error rate in transmissions between the transmitter and receiver are then acquired at step 410 (for example, by a controller). Acquiring the MEV(s) could include, for example, directly measuring a characteristic of the communication system, collecting a value from an element management system, or computing the MEV from collected data.

The measured transmission error value(s), or MEV(s), may be selected from, include and/or be based upon one or more of the following: the BER, errored seconds, errored minutes, the number of code violations over a fixed period of time, the signal-to-noise ratio measured at the receiver, the TCP/IP (or other protocol) throughput at a higher level, and/or a combination of these values. Other values representative of the error rate of the transmission system may also be apparent to those skilled in the art.

Each MEV is then analyzed relative to (for example, compared to) a corresponding target transmission error value, or TEV, at step 420. If the MEV and TEV are equal at decision step 430 (or, perhaps, at least approximately equal within a given tolerance), then the method continues to transmit data at step 405 using the existing CCR. This means that FEC coding in the transmitter/receiver pair is maintaining a desired threshold error rate (or acceptable range of rates), while sending the maximum number of payload data bytes per codeword within this constraint.

If, however, a given MEV is sufficiently different from its corresponding TEV, then appropriate adjustment of the current CCR is decided at decision step 440. Historical performance data may be consulted, for example in the form of a history or library module or database 445, in deciding whether to take any action in adjusting the CCR.

When the measured transmission error value is "sufficiently" below the target transmission error value at decision step 440, the CCR is increased at step 450. "Sufficiency" of difference between the measured transmission error value and the target transmission error value may include considerations beyond the numerical values alone. Changes to the CCR may be triggered according to various preferences (for example, the length of time an MEV remains above/below a TEV). For instance, the MEV may have to remain sufficiently low over a span of days, weeks or longer before triggering a change allowing the CCR to be increased. This would guard against intermittent noise that may not occur often, but is limiting when it does occur.

As noted above, maximum interleaving delay and INP values in G.992.3/4/5 are supplied upon initialization of the modem and there is no way before data transmission to know the error measurement. Some embodiments of the present invention can record and/or maintain a history of performance from previous line initializations and adapt the maximum interleaving delay and INP values set by the operator in ADSL2 (or the N, R and D values set by the transmitter default profile choice in ADSL1).

Changes to the CCR can be determined and implemented in various ways apparent to those skilled in the art. In ADSL1 systems, the CCR may be dependent upon and can be adjusted by changing N, K and/or R. In ADSL2 systems, the CCR may be dependent upon and can be adjusted by changing INP and/or the maximum interleaving delay in the system.

In one embodiment of the present invention, the INP and maximum interleaving delay values passed in the "handshake" between transmitter and receiver can be converted into the usual FEC parameters using the following approximate formulas (where, if erasures are used, t=R, the number of parity bytes, and if erasures are not used and rate includes information and synch/control bits, t=R/2):

$$D' = \text{depth in bytes} = \frac{(INP/4) \times \left(\frac{\text{rate in kbps}}{8}\right)}{t}$$

$$N = \frac{(\text{delay in ms}) \times \left(\frac{\text{rate in kbps}}{8}\right)}{(D'-1)} + 1 \approx \frac{\text{delay}}{\text{burst length}} \cdot t$$

The ratio of the INP parameter to the interleaving depth determines the codeword block size, which is supplied to the transmitter by the receiver by one or more messages implemented in ADSL2. A higher upper limit for the INP value can be used when intermittent noise (not an isolated impulse) is present and a greater fraction of parity bytes per codeword is desired and/or advisable. Other, more refined versions of these parameters that are specific to vendors' implementations could be used with the proper interpretation of INP observed. Further, the parameters M, T, L, etc. can be computed and S inferred for all latency paths as well as the values of B for each frame bearer and latency path. Also, once N is known, then D=ND'. Even approximate adherence to the above mathematical rules should allow reduction of strong intermittent noise on chronic DSL lines. Service providers may well train the modem several times, each time increasing the INP value until zero or small numbers of code violations and/or errored seconds are observed over a time period determined by the service provider.

In another version of adjusting the CCR in an ADSL2 system, FEC codeword composition can be altered during SHOWTIME using an adjustment to the INP value to force a change to the CCR. For example, an ATU-C could send a message to its ATU-R providing a new INP value. The ATU-R uses the new INP value to generate a new CCR (or merely to generate the FEC coding parameters) and sends that to the ATU-C. The modems then implement the new CCR at some mutually agreed to point in time. This type of adjustment to the CCR only modifies the number of payload data bytes and parity data bytes in a codeword, leaving the total codeword size and interleave depth at their current values. A reduction in K, however, will reduce the data rate, but the line rate and S are left as is.

In practical systems, changing the CCR may often lead to a reset so that the modems can reset the FEC parameters. Typically such a reset would occur at the next interval in which data traffic is measured to be zero (typically indicated by low or zero ATM cell counts that are measured and reported in ADSL1 and ADSL2 to the element management system and thus can be forwarded to the controller).

It should be noted that implementation of the present invention when traffic on a system is low or zero may or may not be appropriate, as will be appreciated by those skilled in the art. Moreover, embodiments of the present invention may observe the history of performance of one or more lines over a given period of time and respond to noise/errors in different ways. For example, in one case, if high code violations are observed only once a week, the CCR might not be changed, allowing performance to suffer for only a brief period each week while maintaining higher performance (higher data rates) the rest of the week. On the other hand, in another case, the CCR might be kept at a level to accommodate the "once a week" code violation instigator/generator, thus providing a worst case setting since it might not be possible to know when the line/system will be "hit" by the unusual, error-generating noise. The interval of one week could also be longer or shorter and is used as an example here. One method of setting and/or adjusting the CCR follows:

To compute FEC parameters that affect the CCR, the controller looks at the level of code violations in a given time interval. The formula for non-erasure ADSL1 modems (so this is worst case, since many modems do not use erasures or do not use them properly) may require that the ratio of parity bytes to total codeword bytes (denoted for this example as R/N) exceeds twice the ratio of $(0.017 \times CV)/[15(60)]$.

That is, looking at 15 minutes of 60 seconds each, code violations are measured on 0.017 second intervals in ADSL1—the code violation count is computed every 17 ms (0.017), so the controller computes the fraction by which to multiply the code violation count in 15 minutes to compute the ratio of erroneous bytes to correct bytes received—since 2 parity bytes correct one errored byte (without erasures), then the controller can upper bound the fraction of parity bytes to total bytes necessary to correct all errors this way. That is, $R/N > (0.000038) \times (\# \text{ of CVs})$. So, if a line has 10,000 code violations in 15 minutes, the system would need $R/N > (0.000038) \times (10,000) = 0.38$. In this case, for example, R=16, N=40 (so that R/N=0.40) would work (instead of R=16 and N=240, for instance, as is commonly used in ADSL modems and which yields R/N=0.07).

In exchange for eliminating the errors, the data rate on this line would be reduced by $1-[24/40 \times 240/224]=35.7\%$ of the line's data rate when operated with 10,000 code violations per 15 minutes.

Even in this extreme case of 10,000 violations per quarter hour, approximately ⅔ of the data rate can still be achieved with no errors if the N and R values are changed in the profile according to one or more embodiments of the present invention. Moreover, the latency of the system does not have to be affected by the added error correction capability at the new data rate.

In another example, a controller could measure throughput at the link or network level and adjust the CCR if the throughput is low and code violations are high (or vice versa).

In one embodiment of the present invention, changes to one or more FEC codeword parameters may have to comply with an applicable communications standard. In many cases of impulsive or more generally time-varying intermittent noises, a proportional change to the existing CCR will cause a generally equal proportional change in the transmission error rate. Again, if an intermittent noise is observed once, the CCR might be held for a very long period of time, anticipating that the increased code-violation count will be seen again whenever the offending source is energized again in the future (for example, a vacuum cleaner). Therefore, in another embodiment of the present invention, the proportional increase in the CCR at step 450 may be generally equal to the proportional different between the TEV and the MEV. If the length of codewords sent to an interleaver is changed as a result of the CCR adjustment, then, to preserve the existing latency of the system, the interleave depth D can be adjusted to compensate for a larger or smaller codeword size (for example, D would be reduced at step 455, since when the total number of bytes per interleaved codeword is increased, fewer codewords will be needed to achieve the same latency, and vice versa.

If the error rate as represented by the MEV on this line is too high after comparison at step 440, then the CCR is reduced at step 460. Again, the amount and nature of codeword composition adjustment can be made as appropriate (for example, in keeping with one of the embodiments described above). Moreover, adjustment to the interleaving depth can be made as described above as well (for example, increasing D at step 465).

A specific example follows using aspects of the ADSL1 standard. The number of total bytes in each FEC output data frame to be interleaved is $((S \times K+R)/S)$, where R must always be an integer multiple of S, which may be 1, 2, 4, 8 or 16. In this illustrative example:

delay=4 ms
S=2
R=8 (thus able to correct 4 bytes of error per codeword)
K=188
then each FEC output data frame is $(2 \times 188+8)/2=192$ (K/R=23.5)

If the MEV is sufficiently above the TEV, then K might be cut in half to K'=94, while holding R=16, thus making each FEC output data frame 94 bytes long and yielding K'/R=94/8=11.75. The interleave depth D is increased (by approximately a factor of 2) to maintain the established latency delay of 4 ms. Although the delay will remain constant at 4 ms in this example, the data rate drops due to the fact that each data transmission sent from the transmitter in a given time period will contain fewer payload data bytes per codeword. However, the error rate problem is addressed effectively without having to increase the delay, as would happen pursuant to the '509 patent and other prior methodologies that deepen interleaving.

An alternate solution is to leave K=188 and to increase the number of parity bytes so that R'=16. The FEC output data frame length is 196 bytes and K/R'=188/16=11.75. In this case, the interleave depth probably does not need to be changed, since the codeword length has not changed significantly.

Figure 4:
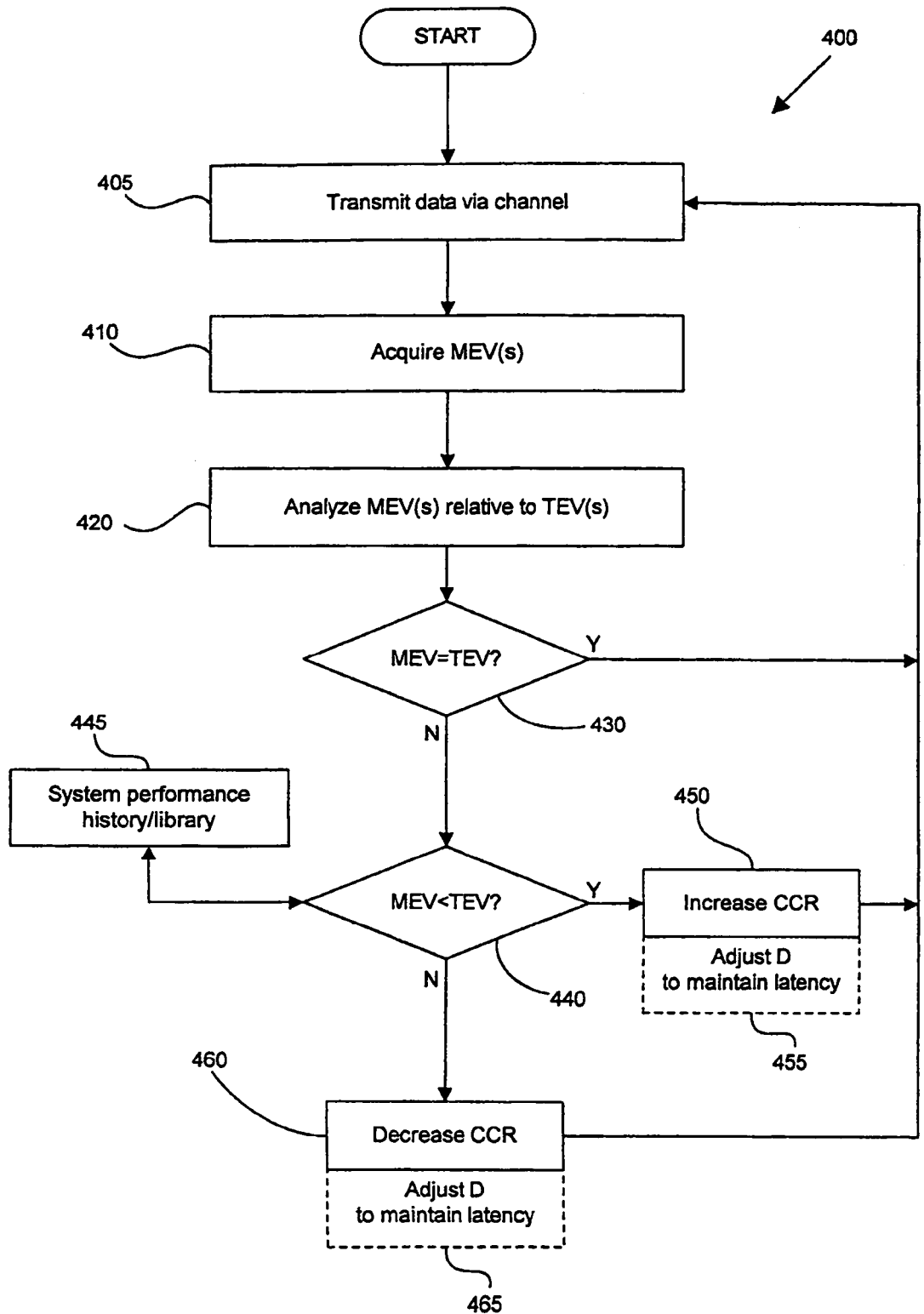
FIG. 4 is a process flow diagram of a method representing one embodiment of the present invention.
Figure 5:
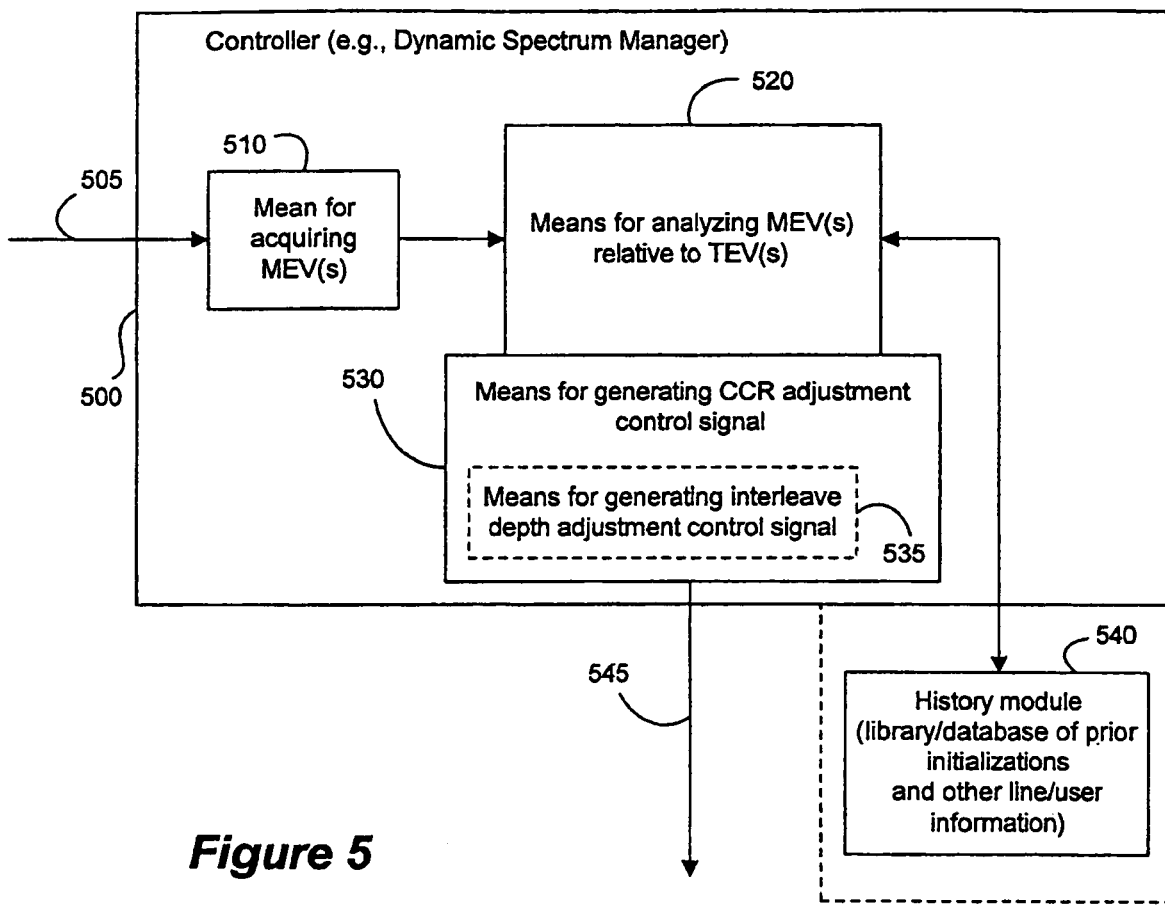
FIG. 5 is a block diagram of one embodiment of a controller.

The method 400 of FIG. 4 can be implemented in a communications system, using a controller (for example, a dynamic spectrum manager or spectrum management center), one embodiment of which is shown in FIG. 5. Referring to FIG. 5, a controller 500 used in implementing one or more embodiments of the present invention is shown. The controller 500 preferably comprises means 510 for acquiring (and possibly monitoring) one or more MEVs, means 520 for analyzing any MEV(s) relative to corresponding TEV(s), and means 530 for generating a CCR adjustment control signal 545. This control signal generator 530 may also include means 535 for generating an interleave depth adjustment control signal 545, for cases where the changes to an existing CCR would require a change in the interleave depth D as well.

The means 510 for acquiring the MEV(s) preferably comprises a transmission error value monitor for acquiring a transmission error value and generating a signal representative of that MEV, as is known to those skilled in the art. Means 510 might receive an MEV by receiving an input signal 505 that is representative of the value being sought. Acquiring the MEV(s) could include, for example, directly measuring a characteristic of the communication system, collecting a value from an element management system, or computing the MEV from collected data. The MEV(s) might be acquired using code violation or errored-second counts (both are available) from the element management system that periodically acquires the number of CRC violations that have occurred (for example, during 15 minute intervals in ADSL). Code violations and/or errored seconds also could be obtained by interface to an ATU-R modem through a vendor database or "email" message to the controller (which thus circumvents the element management system).

As noted above the transmission error values are preferably chosen from (or are based upon one or more members of) the group consisting of the communications system's BER, errored seconds, errored minutes, the number of code violations over a fixed period of time, the signal-to-noise ratio measured at the receiver, the TCP/IP or other protocol throughput at a higher level and/or a combination of these values. This can be done by monitoring and/or measuring the bit error rate, errored minutes, code violations and/or the signal-to-noise ratio at the receiver. These measurements may be made directly by the controller 500 or may be sent by the receiver to controller 500 by any suitable alternative means (for example, sending the data to a DSL central office via the transmitter-receiver pair's communication).

The means 520 for analyzing one or more MEV(s) relative to the corresponding TEV(s) can comprise software, hardware or a combination of the two. In some embodiments of the present invention, the controller 500 is a computer or computer system attached to an ADSL element management system interface (directly or indirectly through service provider intermediate entities). Monitoring, measuring, analysis, comparing, processing, evaluation, and N, R, D or INP/Maximum Interleaving Delay recommendations can be implemented via this interface. The controller 500 also can maintain a history module 540 (for example, a library or database of events) that helps makes better recommendations over time and assists in analyzing the MEV(s) relative to the TEV(s) by means 520. Other various structures implementable in connection with embodiments of the present invention will be apparent to those skilled in the art. For example, as suggested by the dashed line in FIG. 5, module 540 may be an external module that is accessed as necessary by controller 500. Finally, means 530 and 535 for generating appropriate control signals 545 likewise can be implemented using software, hardware and/or a combination thereof. The analyzing means 520 and generating means 530, 535 may be a single unit or module or be separate units.

As illustrated in the following embodiments, the system preferably measures the desired transmission error value. This MEV of the system is analyzed, which may include comparing the MEV to a TEV. The CCR can then be adjusted in response to the MEV's deviation from the TEV. Alternatively, MEVs may be measured and compared, either alone or in combination, to any appropriate TEV(s). While such a system is of particular importance with regard to digital subscriber lines, those skilled in the art will appreciate that it is applicable to any system that incorporates codeword-type data structures and interleaving, especially where it is desirable to avoid increasing latency when improving error correction.

Figure 6:
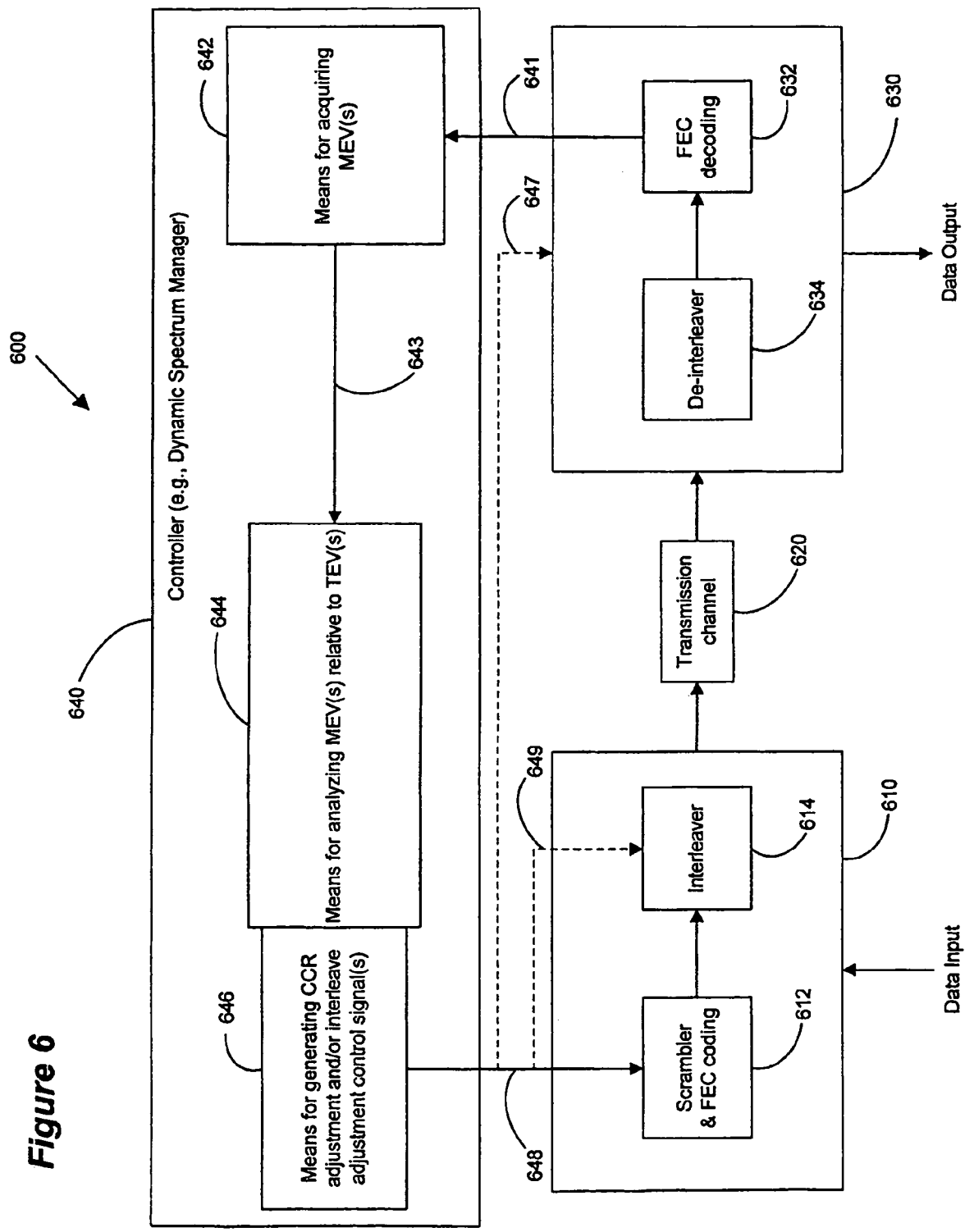
FIG. 6 is a block schematic diagram of communication system implementing one embodiment of the present invention.

By way of example, FIG. 6 shows a transmission system 600 comprising a transmitter 610, a transmission channel 620, a receiver 630 and a controller 640. The transmitter includes an FEC coder 612 coupled to an interleaver 614 (the transmitter may and likely does include more components). The FEC coder 612 generates FEC codewords having a given codeword composition ratio designed to meet error correction requirements and the FEC coding scheme of the system 600. The interleaver 614 may be any suitable interleaver used to interleave data to be transmitted by the transmitter 600 over the transmission channel 620. In an ADSL1 system, the FEC coder 612 and interleaver 614 would be part of the "interleaved data path" as opposed to the "fast data path" available without interleaving.

The receiver 630 receives and decodes the transmitted data. Data that has been interleaved in the transmitter is de-interleaved by a de-interleaver 634 and then decoded by FEC decoder 632. In so doing, the receiver 630 is able to generate information (for example, in the form of an input signal 641) relating to the bit error rate of the system 600 and other information pertaining to errors generated in the transmission of data through channel 620. As will be appreciated by those skilled in the art, embodiments of the present invention may also be used where no interleaving is implemented (for example, where S=1 for ADSL systems). As also will be appreciated by those skilled in the art, FIG. 6 tacitly assumes that the means for generating CCR adjustment control talks to the transmitter. However, it should be kept in mind that INP/Maximum Interleaving Delay parameters might be sent to a receiver that uses them to set its N, R and D as part of a loading algorithm. Such variations are contemplated by and embodied in the Figures and the present disclosure.

The controller 640 measures error rate performance of the system 600 at the receiver 630 in an effort to determine whether adjustment of the CCR is beneficial and how best to implement such an adjustment. The controller 640 generates a CCR adjustment control signal 648 in response to the MEV(s) and the controller's analysis of the MEV(s) relative to the TEV(s). The FEC coder 612 adjusts the CCR in response to the CCR adjustment control signal 648. In cases where the system's original transmission latency is being maintained and interleaving is used, the controller 640 also may generate an interleave depth control signal 649 to adjust the interleave depth to compensate for adjustments to the CCR to maintain the original transmission latency that might otherwise be changed by signal 648 and the FEC coder 612 in transmitter 610. Finally, as noted above, a receiver-bound control signal 647 may be sent to the receiver as required in some cases where the INP and maximum interleaving delay parameters are used by a receiver to set the CCR.

The FEC coder 612 preferably comprises means for receiving a multiple bit CCR adjustment control signal and means for adjusting the CCR in response to the CCR adjustment control signal, as will be known to those skilled in the art. The FEC coder 612 preferably further comprises means for adjusting the composition of codewords produced in the coder 612, as known to those skilled in the art. The FEC coder 612 is preferably coupled with the transmitter 610 and the controller 640.

Similarly, the interleaver 614 preferably comprises means for receiving a multiple bit interleave depth adjustment control signal and means for adjusting the depth of interleaving in response to the interleave depth adjustment control signal, as will be known to those skilled in the art. The interleaver 614 preferably further comprises means for adjustably interleaving data at different interleave depths as known to those skilled in the art. The interleaver 614 is preferably coupled with the transmitter 610 and the controller 640.

The FEC coder 612 preferably receives data and generates codewords by adding parity bytes to the payload data bytes, preferably in a manner similar to those discussed above. One example of such a technique is Reed-Solomon coding, as described in the ADSL1 standard. An original CCR is provided to and/or determined by the FEC coder 612 in any suitable manner, as is known to those skilled in the art. One example of FEC coding usable in connection with the present invention is described in the ADSL1 standard.

The codewords are sent to the interleaver 614, which interleaves the data by rearranging the order in which the bits that comprise the data are transmitted. Any suitable adjustable interleaver that is responsive to a multiple bit interleave depth adjustment control signal, as known to those skilled in the art, can be configured for use in the present embodiments. One example of convolutional interleaving usable in connection with the present invention is described in the ADSL1 standard.

The transmitter 610 preferably comprises an ADSL transmitter known to those skilled in the art. Alternatively, the transmitter 610 can comprise a digital transmitter for use with any form of transmission media as known to those skilled in the art. Alternatively, the transmitter 610 can comprise any transmitter for use with any form of transmission media as known to those skilled in the art. The transmitter 610 is preferably coupled with the FEC coder 612, the interleaver 614, the controller 640 and the transmission channel 620.

The transmitter 610 may modulate data (for example, using an inverse Fourier transform technique) for transmission to the receiver 630 via the transmission channel 620 as known to those skilled in the art. The transmitter 610 can preferably transmit data at different data rates as known to those skilled in the art. The capacity of the transmission channel 620 typically depends on factors including the following: the distance a transmission has to travel; the wire gauge of the transmission channel; the number of bridged-taps on the transmission channel; the temperature of the transmission channel, splice loss of the transmission channel; noise present in the transmission channel; and the precision of the transmitter and receiver. While many of these factors are not directly measurable, their cumulative effect may be monitored by measuring one or more of the transmission error values mentioned above (for example, the BER). Thus, the CCR, interleave depth and data rate can be adapted in response to the MEV(s).

The FEC coder 612 can adjust the CCR in a number of ways. For example, the CCR can be altered by changing the number of payload data bytes per codeword (K), while leaving the number of parity bytes R unchanged. In ADSL2 systems, the INP value could be increased while the maximum interleaving delay is held constant.

The CCR could be adjusted by resetting the modem and in ADSL1 then setting the N, R, and D through the element management system MIB to the ATU-C. These values would correspond to those computed as best (or to be tried next) on the next reset of the DSL line that causes exchange of N, R, D and the equipment vendor's choice of S during initialization. The CCR could be adjusted in ADSL2 by providing N, R and D for upstream and the INP/Maximum Interleaving Delay for downstream through the element management system MIB to the ATU-C. The INP/Maximum Interleaving Delay values would be communicated during initialization to the ATU-R, which would then compute the corresponding N, R, S and D parameters that best approximate the desired INP and Maximum Interleaving Delay settings.

Accordingly, a greater or lesser number of payload bytes can be transmitted within a given time interval, depending on any adjustments made to the original CCR. Alternatively, the CCR can be adjusted by altering the number of parity bytes per codeword, while holding the number of payload data bytes unchanged. Changes to the CCR might be implemented only when the cell count is low or zero, meaning the user is not active and thus will not even notice retraining of the system to improve their service.

The transmission channel 620 preferably comprises twisted-pair conductive wire as known to those skilled in the art. Alternatively, the transmission channel can comprise coaxial cable, optical fiber, free-space laser, radio or any other type of transmission media as known to those skilled in the art. The transmission channel 620 preferably couples the transmitter 610 and the receiver 630.

The receiver 630 preferably comprises an ADSL receiver having an adjustable de-interleaver 634 and an adjustable decoder 632, as known to those skilled in the art. Alternatively, the receiver 630 can comprise a digital receiver for use with any type of transmission media as known to those skilled in the art. Alternatively, the receiver 630 can comprise any type of receiver for use with any type of transmission media as known to those skilled in the art. For example, the decoder 632 of receiver 630 can employ a Reed-Solomon decoder or any other suitable error correcting decoder as known to those skilled in the art. In the exemplary system 600 of FIG. 6, the receiver 630 is preferably coupled to the transmission channel 620 and to the transmission error value measuring means 642 of the controller 640.

The receiver 630 receives and demodulates the data from the transmitter 610. After demodulation, the de-interleaver 634 of receiver 630 de-interleaves the data. The decoder 632 utilizes decoding techniques known to those skilled in the art to detect and correct errors in the transmitted data. In particular, the decoder 632 analyzes the transmitted data using the redundant bytes that are generated by FEC coder 612 prior to transmission to determine whether any data was corrupted and thus requires correction. Reed-Solomon error correction coding can correct R/2 bytes if the codeword has R parity bytes; for example, in ADSL a codeword composition selection may be N=204, K=188, and R=16 which can correct 8 erroneous bytes per 204-byte codeword. ADSL constrains R to be an even integer between 0 and 16 plus N is limited to 255 by use of the field GF(256).

The controller 640 preferably comprises means 642 for collecting and/or calculating one or more MEVs, means 644 for analyzing the MEV(s) (for example, by comparing the MEV(s) to the TEV(s)), and means 646 for providing CCR adjustment and interleave depth adjustment control signals. The means 642 preferably comprises a monitor for measuring, collecting and/or calculating one or more of the transmission error values mentioned above, as is known to those skilled in the art. The transmission error value(s) monitor 642 preferably is coupled to the decoder 632 and the controller 640 in the exemplary system 600 of FIG. 6. As mentioned above, any appropriate transmission error values can be used that provide a representation of the error rate of the system

600. Various values can be used and various ways of measuring those values are known to those skilled in the art. Therefore, the transmission error value(s) can be determined through a variety of techniques, and any suitable method of selecting, measuring and determining the transmission error value(s) can be adapted for use in the presently preferred system. Averaging many measurements of the transmission error value(s) can be performed to improve the accuracy of the current transmission error value measurement, as is known to those skilled in the art.

Means 642 preferably generates an input signal 643 that varies as a function of the MEV(s). Alternatively, the input signal 643 can take many forms and can be based in whole or in part on the BER, errored seconds, etc. The input signal 643 can be analog or digital and linear or non-linear, as will be appreciated by those skilled in the art. Alternatively, the input signal 643 can be binary such that the input signal 643 is greater than or less than one or more threshold values based upon the MEV(s). Means 642 may continuously generate the input signal 643, if desired. Alternatively, means 642 can generate the input signal 643 in a sampled or periodic fashion, on a random or non-random basis.

The means 644 for analyzing input signal 643 preferably comprises means for analyzing the MEV(s) relative to the TEV(s), such as a threshold value, based upon an analysis of the input signal 643. This can be accomplished by comparing the input signal 643 to one or more TEV(s), possibly allowing for slight variations and tolerances. Alternatively, the means 644 for analyzing the MEV(s) input signal 643 can analyze multiple input signals that correspond to MEVs. The means 644 for analyzing input signals is preferably implemented in computer readable program code written in any suitable programming language and implemented on an analog or digital computer utilizing any suitable operating system. The analyzing means 644 also can be implemented through the use of hardware in the form of a hardwired computer, an integrated circuit, or a combination of hardware and computer readable program code.

The CCR adjustment and interleave depth control signals 647, 648, 649 can take many forms. Control signals 647, 648, 649 can be based in whole or in part on one or more input signals, such as input signal 643. The control signals 647, 648, 649 can be analog or digital and linear or non-linear, as appreciated by those skilled in the art. Alternatively, the control signals 647, 648, 649 can be binary. The means 646 for providing one or more control signals is preferably implemented in computer readable program code written in any suitable programming language and implemented on an analog or a digital computer utilizing any suitable operating system. The means 646 for providing the control signals 647, 648, 649 also can be implemented through the use of hardware in the form of a hardwired computer, an integrated circuit, or a combination of hardware and computer readable program code.

Figure 7:
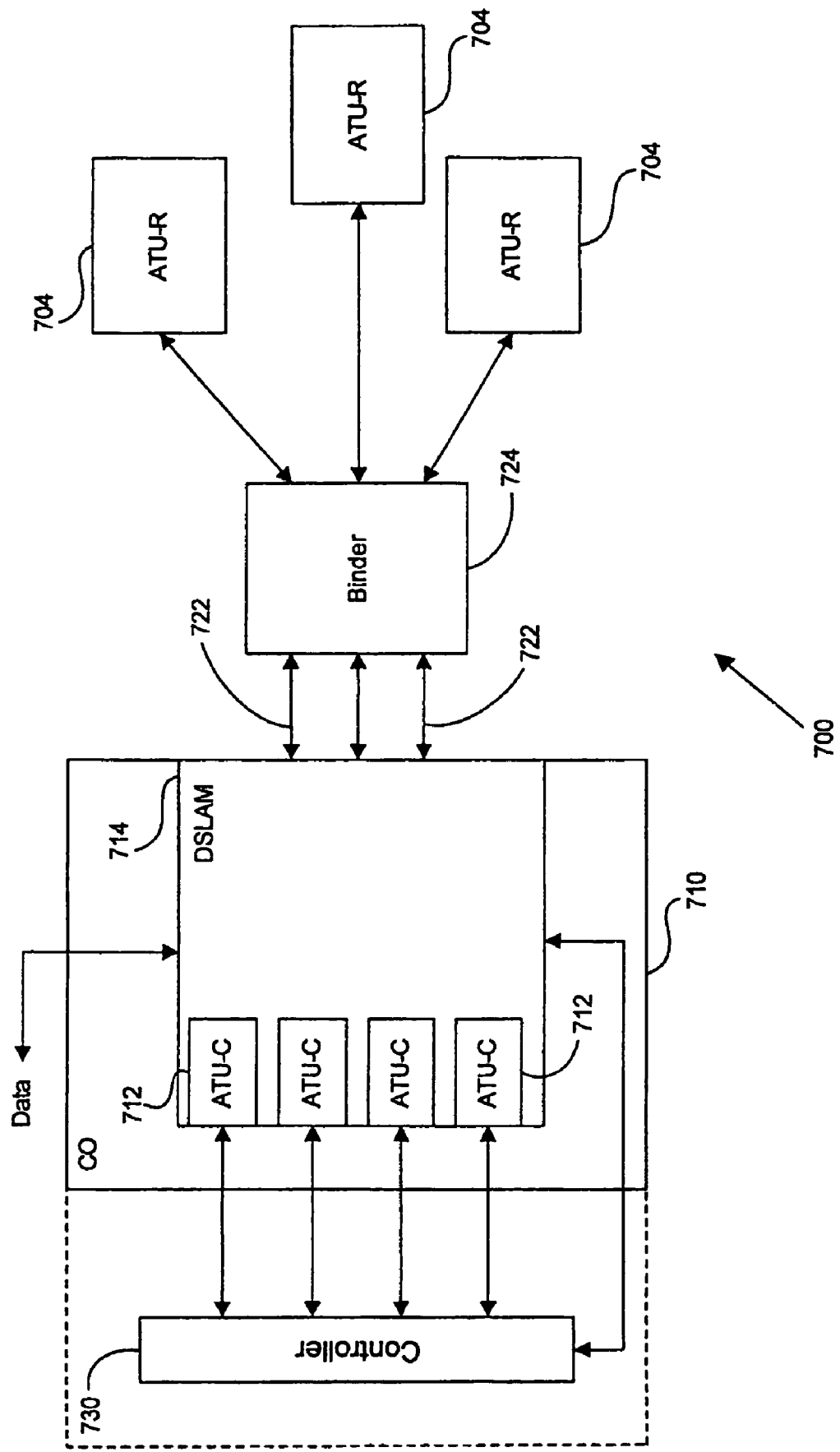
FIG. 7 is a block schematic diagram of a DSL communication system implementing one embodiment of the present invention.

A second embodiment of a communication system implementing the present invention is shown in FIG. 7, which illustrates an example using a common scenario in the implementation of DSL systems. System 700 has a central office 710 and a number of remote locations 704 downstream of the CO 710. The system 700 shown in FIG. 7 may be an ADSL1 system, so that each remote location 704 is a transceiver that functions both as a transmitter and a receiver. These remote locations 704 are ATU-R units, according to the ADSL1 standard. There are counterpart transceivers 712 in the CO 710. Again, these are ATU-C transceivers according to the ADSL1 standard and function as both transmitters and receivers. A DSL access module (DSLAM) 714 coordinates signals to and from the CO 710 through loops 722. A number of loops 722 may share a common binder 724, giving rise to crosstalk and/or other interference, and typically are exposed to various sources of noise and other error-generating phenomenon.

A controller 730 according to one embodiment of the present invention is coupled to the transceivers 712 in the CO 710 and/or the DSLAM 714. As suggested by the dashed line extending from the CO 710, controller 730 may be in the CO 710 or may be external to the CO 710. In some cases, the controller 730 may be operated by an entity independent of the CO 710 and any users or service providers using transceivers 712 in the CO 710 or at any remote locations 714. The controller 730 functions in generally the same manner as described above. However, instead of being directly connected to each remote location 704, the controller 730 monitors error rate information via a single transceiver 712 in each ATU-C/ATU-R pair.

Instead of measuring transmission error values in each receiving unit 704, 712, the controller 730 collects this information from the transceivers 712 in the CO 710 only. This can be done by having the remote transceivers 704 send their error rate data to the controller 730 directly or by having each ATU-R 704 provide that information to its ATU-C 712 counterpart, which in turn supply that data to the controller 730. In some embodiments, the information can be collected from the DSLAM 714 through the element management system (per G.997.1 or DSL forum document WT-87/82). However, information can also be extracted from the system 700 through the "email" method in which each transceiver 704, 712 sends its information to the controller 730 via a communication route outside the DSL lines' operating system. There is an EOC (embedded operations channel) that the user does not see in the payload data where the ATU-R and ATU-C exchange messages about performance with one another. This performance information is then available through the element management system (for example, an MIB if SNMP, simple network management protocol, is used). In all other respects, the exemplary system of FIG. 7 functions analogously to those embodiments of the present invention described above.

In some embodiments of the present invention, implementations include communication system equipment providing more profile options for different (though not necessarily all) values of N. This allows a controller to select/recommend the appropriate profile that provides the highest data rate available with little or no errors within the remaining constraints of the communication system.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
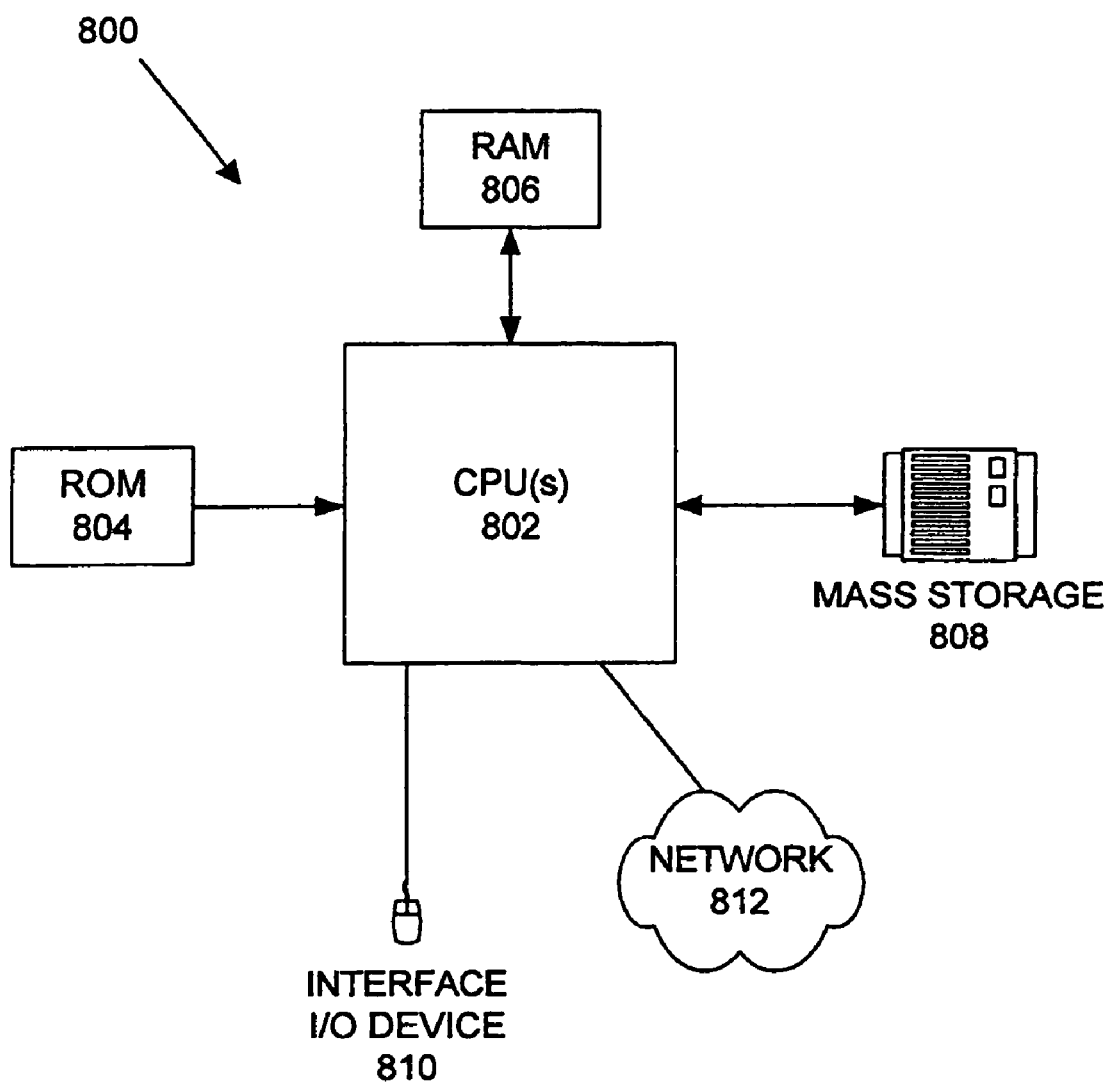
FIG. 8 is a block diagram of a typical computer system suitable for implementing an embodiment of the present invention.

FIG. 8 illustrates a typical computer system that can be used by a user and/or controller in accordance with one or more embodiments of the present invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 808 or 814 and executed on CPU 802 in conjunction with primary memory 806. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A controller communicatively interfaced with a Digital Subscriber Line (DSL) modem operating in a DSL system, the DSL modem to transmit data via a channel according to original transmission parameters, wherein the controller comprises:

a means, coupled with the DSL modem, for repeatedly acquiring Measured transmission Error Values (MEVs) representing impulse noise events detected on the channel, the MEVs acquired after training and initialization on the DSL modem;

a means, coupled with the acquiring means, for analyzing the acquired MEVs relative to a Target transmission Error Value (TEV); and a means, coupled with the analyzing means, for generating a retransmission overhead control signal to modify the original transmission parameters during normal operation of the DSL modem ("SHOWTIME") responsive to the means for analyzing, and transmitting the same to the DSL modem.

2. The controller of claim 1, wherein the MEVs are based on at least one of:
a bit error rate;
errored seconds;
errored minutes;
code violations over a fixed period of time;
a Signal-to-Noise Ratio (SNR) measured at the receiver; and
Transmission Control Protocol and Internet Protocol (TCP/IP) throughput.

3. The controller of claim 1, wherein the acquiring means, the analyzing means, and the generating means are implemented as computer readable program code.

4. The controller of claim 1, wherein the acquiring means, the analyzing means, and the generating means are implemented as hardware.

5. The controller of claim 1, wherein the TEV is a threshold error rate limit.

6. The controller of claim 1, further comprising:
a historical data module to store historical MEVs representing impulse noise events detected on the channel over time, wherein the historical data module is coupled with the analyzing means; and wherein
analyzing the acquired MEVs relative to the TEV comprises analyzing the historical MEVs for information about impulse noise events that occurred during prior transmissions on the channel.

7. The controller of claim 6, wherein the historical data module comprises a database.

8. The controller of claim 1, wherein the controller comprises a dynamic spectrum manager.

9. The controller of claim 1, wherein:
the DSL modem is an Asymmetric Digital Subscriber Line (ADSL) modem operable in compatibility with an ADSL2 standard; and wherein
the generated retransmission overhead control signal to adjust at least one of the following parameters:
Impulse Noise Protection (INP), and
Codeword Composition Ratio (CCR).

10. The controller of claim 1, wherein the means for repeatedly acquiring the MEVs comprises means for receiving an input signal representative of the MEVs.

11. A method for generating a retransmission overhead control signal in a Digital Subscriber Line (DSL) modem having a transmitter to exchange data between a transmitter and a receiver on a channel, the method comprising:
(a) transmitting a control signal from the DSL modem via the channel, wherein the control signal specifies retransmission overhead parameters for the retransmission overhead control signal;
(b) repeatedly acquiring Measured transmission Error Values (MEVs) representing impulse noise events detected on the channel, the MEVs acquired after training and initialization on the DSL modem;
(c) analyzing the acquired MEVs relative to a Target transmission Error Value (TEV); and
(d) adjusting the retransmission overhead parameters when the MEV differs sufficiently from the TEV.

12. The method of claim 11, wherein repeatedly acquiring the MEVs comprises at least one of the following:
directly measuring a characteristic of the DSL modem;
collecting a value from an element management system; and
computing the MEVs from collected data.

13. The method of claim 11, wherein steps (a) through (d) are repeated.

14. The method of claim 11, wherein the method is performed by one of:
a controller communicably interfaced with the DSL modem;
a controller embodying a dynamic spectrum manager;
a controller physically located within a Central Office (CO);
a controller physically located separate from the CO;
a controller operated by an entity which operates the DSL modem; and
a controller operated independently of the entity which operates the DSL modem.

15. The method of claim 11, wherein analyzing the acquired MEVs relative to the TEV comprises analyzing historically acquired MEVs representing impulse noise events that occurred during prior transmissions on the channel.

16. The method of claim 11, wherein the MEV is based on at least one of the following:
a Bit Error Rate (BER);
errored seconds;
errored minutes;
code violations over a fixed period of time;
a Signal-to-Noise Ratio (SNR) measured at the receiver; and
Transmission Control Protocol and Internet Protocol (TCP/IP) throughput.

17. The method of claim 11, wherein repeatedly acquiring the MEVs, analyzing the acquired MEVs relative to the TEV, and adjusting the retransmission overhead parameters are implemented in computer readable program code.

18. The method of claim 11, wherein repeatedly acquiring the MEVs, analyzing the repeated MEVs relative to the TEV, and adjusting the retransmission overhead parameters are implemented in hardware.

19. The method of claim 11, wherein:
the DSL modem is an Asymmetric Digital Subscriber Line (ADSL) system operable in compatibility with an ADSL2 standard; and wherein
adjusting the retransmission overhead parameters comprises adjusting Impulse Noise Protection (INP), Codeword Composition Ratio (CCR), or both.

20. A transmission system comprising:
a transmission channel to carry data between a transmitter and a receiver/decoder, each communicatively interfaced with the transmission channel;
a transmission error value monitor communicatively interfaced with the receiver/decoder to periodically monitor for transmission error values indicative of impulse noise events on the transmission channel, wherein the transmission error values are periodically monitored after training and initialization on the receiver/decoder, the transmission error values being selected from a group comprising: a bit error rate, errored seconds, errored minutes, code violations over a fixed period of time, Signal-to-Noise Ratio (SNR) measured at the receiver/decoder, and Transmission Control Protocol and Internet Protocol (TCP/IP) throughput, and wherein the transmission error value monitor to further generate an input signal based on the transmission error values monitored; and
a controller coupled with the transmitter to receive the input signal from the transmission error value monitor and to further generate a retransmission overhead control signal for the transmitter in response to the input signal.

* * * * *